(12) United States Patent
Pakusch et al.

(10) Patent No.: US 8,119,727 B2
(45) Date of Patent: Feb. 21, 2012

(54) USE OF COMB POLYMERS AS A GRINDING AGENT FOR PREPARATIONS CONTAINING CEMENT

(75) Inventors: Joachim Pakusch, Speyer (DE); Stefan Becker, Mannheim (DE); Thomas Goetz, Leimersheim (DE); Rainer Dyllick-Brenzinger, Neustadt (DE); Rolf Gulden, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 286 days.

(21) Appl. No.: 12/095,799

(22) PCT Filed: Nov. 23, 2006

(86) PCT No.: PCT/EP2006/068834
§ 371 (c)(1),
(2), (4) Date: Jun. 2, 2008

(87) PCT Pub. No.: WO2007/063030
PCT Pub. Date: Jun. 7, 2007

(65) Prior Publication Data
US 2008/0293850 A1  Nov. 27, 2008

(30) Foreign Application Priority Data
Dec. 2, 2005  (DE) .................. 10 2005 057 896

(51) Int. Cl.
*C04B 7/02* (2006.01)
*C08L 33/02* (2006.01)
(52) U.S. Cl. ............. 524/558; 524/2; 524/5; 524/556
(58) Field of Classification Search ........... 524/2, 5, 524/556, 558
See application file for complete search history.

(56) References Cited

U.S. PATENT DOCUMENTS

| | | | |
|---|---|---|---|
| 4,808,641 A * | 2/1989 | Yagi et al. ................ | 524/5 |
| 5,728,207 A | 3/1998 | Arfaei et al. | |
| 5,840,114 A | 11/1998 | Jeknavorian et al. | |
| 6,005,057 A * | 12/1999 | El-Jazairi ................ | 525/327.7 |
| 6,034,208 A * | 3/2000 | McDaniel et al. ........ | 528/403 |
| 6,384,111 B1 | 5/2002 | Kistenmacher et al. | |
| 6,713,553 B2 * | 3/2004 | Gonnon et al. ........... | 524/552 |
| 6,849,703 B2 * | 2/2005 | Kroner et al. ............ | 526/317.1 |
| 6,936,098 B2 * | 8/2005 | Ronin ..................... | 106/735 |
| 6,960,624 B2 * | 11/2005 | Gonnon et al. ........... | 524/556 |
| 7,232,875 B1 * | 6/2007 | Liotta et al. .............. | 526/318.3 |
| 2007/0185258 A1 * | 8/2007 | Suau et al. ............... | 524/556 |

FOREIGN PATENT DOCUMENTS

| | | |
|---|---|---|
| EP | 0 331 308 | 8/1993 |
| EP | 0 560 602 | 9/1993 |
| EP | 0 725 044 | 8/1996 |
| EP | 0 753 488 | 1/1997 |
| EP | 0 976 695 | 2/2000 |
| EP | 0 799 807 | 7/2002 |
| EP | 1 260 535 | 11/2002 |
| EP | 0 792 850 | 10/2003 |
| GB | 2 309 693 | 8/1997 |
| WO | 98 28353 | 7/1998 |
| WO | 2005 123621 | 12/2005 |

OTHER PUBLICATIONS

U.S. Appl. No. 12/516,628, filed May 28, 2009, Uribe et al.
U.S. Appl. No. 12/517,360, filed Jun. 3, 2009, Jung et al.

* cited by examiner

*Primary Examiner* — David W Wu
*Assistant Examiner* — Vu A Nguyen
(74) *Attorney, Agent, or Firm* — Oblon, Spivak, McClelland, Maier & Neustadt, L.L.P.

(57) ABSTRACT

The present invention relates to the use of comb polymers which have a carbon backbone which bears polyether groups of the formula A $$*-U-(C(O))_k-X-(Alk-O)_n-W \qquad A$$

wherein
* indicates the binding site to the carbon backbone of the comb polymer,
U stands for a chemical bond or an alkylene group with 1 to 8 C atoms,
X means oxygen or a NR group,
k is 0 or 1,
n stands for a whole number, the mean value whereof, based on the comb polymer, lies in the range from 5 to 300,
Alk stands for $C_2$-$C_4$ alkylene, where Alk within the group (Alk-O)$_n$ can be the same or different,
W means a hydrogen, a $C_1$-$C_6$ alkyl residue or an aryl residue or means the group Y—Z,
Y stands for a linear or branched alkylene group with 2 to 8 C atoms, which may bear a phenyl ring,
Z stands for a 5- to 10-membered nitrogen heterocycle bound via nitrogen, which can have as ring members, as well as the nitrogen atom and as well as carbon atoms, 1, 2 or 3 additional hetero atoms, selected from oxygen, nitrogen and sulfur, wherein the nitrogen ring members can contain a group R', and wherein 1 or 2 carbon ring members can be present as carbonyl groups,
R stands for hydrogen, $C_1$-$C_4$ alkyl or benzyl, and
R' stands for hydrogen, $C_1$-$C_4$ alkyl or benzyl;
and functional groups B, which are present in the form of anionic groups at pH>12,
and salts thereof as grinding aids in cement-containing preparations.

14 Claims, No Drawings

USE OF COMB POLYMERS AS A GRINDING AGENT FOR PREPARATIONS CONTAINING CEMENT

The present invention relates to the use of comb polymers which on a carbon backbone bear poly-$C_2$-$C_4$ alkylene ether side-chains A and functional groups B, which are present in the form of anionic groups at pH>12, and the salts of such comb polymers as grinding aids for cement-containing preparations.

Cement is a hydraulic binding agent. When mixed with water, cement gives cement paste which solidifies and hardens by hydration and which even after hardening under water remains solid and dimensionally stable.

Cement consists of the main component Portland cement clinker, the secondary components granulated slag, pozzolan, fly ash, limestone and/or fillers and also a calcium sulfate-containing component and so-called cement additives. From the statistical viewpoint, the cement components must be homogeneous in composition. High uniformity of all cement properties must be attained by continuous production with large mass flows, in particular by effective grinding and homogenization processes.

In spite of many advances in grinding technology, the majority of cement is still ground in tube ball mills, wherein the effect of grinding aids is of particular importance.

During cement clinker or limestone grinding, grinding aids have in particular the task of enabling higher grinding fineness of the grinding stock.

Grinding aids work by coating the particles tending to agglomerate with monomolecular layers and thus result in neutralization of the surface charges. Physically speaking, the grinding aids rapidly provide charge carriers, which are available for saturation of the charges arising on the fracture surfaces during the crushing of the clinker particles and as a result reduce the tendency to agglomeration. Apart from this, grinding aids are absorbed on the fracture surfaces of the still unseparated grains and prevent their recombination under the action of temperature and pressure.

As a rule, the cement raw material is ground dry. During the dry preparation, the raw material components are fed through metering devices to a mill in a defined mixing ratio and ground to raw meal. During the grinding process, warming of the grinding stock occurs, as a result of which the temperature of the grinding stock taken out of the grinding unit can be 80 to 120° C. Typical grinding units are tube mills (ball mills), but also roller mills.

The efficacy of known grinding aids varies greatly. The known grinding aids include triethanolamine, various carboxylic acids and salts thereof, for example octadecanoic acid or the sodium salt thereof.

EP-A 331 308 describes comb polymers for the dispersing of cement, which contain a monoethylenically unsaturated carboxylic acid, a monoethylenically unsaturated sulfonic acid and an ester of a poly-$C_2$-$C_3$ alkylene glycol mono-$C_1$-$C_3$ alkyl ether polymerized together.

Again, EP-A 560 602 describes the use of comb polymers which contain an alkylene ether of a poly-$C_2$-$C_{18}$ alkylene glycol mono-$C_1$-$C_4$ alkyl ether and maleic acid or maleic anhydride polymerized together, as additives for concrete.

Again, from EP-A 753 488 the use of comb polymers which contain mono-ethylenically unsaturated carboxylic acids and esters of monoethylenically unsaturated carboxylic acids of polyoxy-$C_2$-$C_4$ alkylene mono-$C_1$-$C_4$ alkyl ethers polymerized together and which have a defined molecular weight distribution as dispersing agents for cement is known. Similar polymers are described for this purpose in EP-A 792 850.

Again, EP-A 725 044 describes the use of comb polymers from monoethylenically unsaturated monocarboxylic acids and esters of monoethylenically unsaturated carboxylic acids with polyoxyethylene mono-$C_1$-$C_5$ alkyl ethers in hydraulically setting mixtures based on a mixture of cement and anhydrous gypsum.

Again, EP-A 799 807 describes the use of comb polymers based on mono-ethylenically unsaturated monocarboxylic acids and alkylpolyalkylene glycol mono(meth)acrylic acid esters, wherein the latter are obtainable by a transesterification process, as dispersants for cement.

U.S. Pat. No. 5,728,207 and U.S. Pat. No. 5,840,114 describe the use of comb polymers which were obtained by polymer modification of polymers, which have cyclic anhydride groups, with alkylpolyalkylene ether amines, as additives for cement-containing preparations. From WO 98/28353, comb polymers with a carbon backbone which bears alkyl-polyalkylene ether groups and carboxylate groups are known. The comb polymers can be produced both by modification of carboxylate group-containing polymers with polyalkylene ethers and also by copolymerization of suitable monomers containing alkylpolyalkylene ether groups with ethylenically unsaturated carboxylic acids.

EP 976 695 describes tin (II) sulfate as a grinding aid.

With the known grinding aids, the quantities added, based on the grinding stock, typically lie between 0.05 and 0.2 wt. % or markedly higher.

Grinding aids require optimization of the following characteristics: prevention of caking in the grinding unit, attainment of as high as possible a grinding fineness, or high specific area of the grinding stock (Blaine fineness), improvement of the flowability of the grinding stock, homogenization of the grinding stock, dispersion of agglomerates of the grinding stock and a reduction in the quantity of the grinding aid added.

The present invention is therefore based on the objective of providing grinding aids for cement-containing preparations, which fulfill the characteristics stated above.

It has surprisingly been found that this objective is achieved by means of comb polymers with a carbon backbone, which bear polyether groups of the formula A defined below and functional groups B, which are present in the form of anionic groups at pH>12 on the polymer backbone.

Accordingly, the present invention relates to the use of comb polymers which have a carbon backbone which bears polyether groups of the formula A $$*-U-(C(O))_k-X-(Alk-O)_n-W \qquad A$$

wherein

* indicates the binding site to the carbon backbone of the comb polymer,

U stands for a chemical bond or an alkylene group with 1 to 8 C atoms,

X means oxygen or an NR group, k is 0 or 1, n stands for a whole number, the mean value whereof, based on the comb polymer, lies in the range from 5 to 300, Alk stands for $C_2$-$C_4$ alkylene, where Alk within the group $(Alk-O)_n$ can be the same or different, W means a hydrogen, a $C_1$-$C_6$ alkyl residue or an aryl residue or means the group Y—Z, wherein Y stands for a linear or branched alkylene group with 2 to 8 C atoms, which may bear a phenyl ring, Z stands for a 5- to 10-membered nitrogen heterocycle bound via nitrogen, which can have as ring members, as well as the nitrogen atom and as well as carbon atoms, 1, 2 or 3 additional hetero atoms, selected from oxygen, nitrogen and sulfur, wherein the nitrogen ring members may have a group R', and wherein 1 or 2 carbon ring members can be present as carbonyl groups, R stands for hydrogen, $C_1$-$C_4$ alkyl or benzyl, and R' stands for hydrogen, $C_1$-$C_4$ alkyl or benzyl;

and functional groups B, which are present in the form of anionic groups at pH>12, and salts thereof as grinding aids in cement-containing preparations.

The invention further relates to cement-containing preparations which contain such a comb polymer, in particular ready-to-use preparations and the objects produced therefrom.

Such comb polymers are novel when the mean value of n, based on the comb polymer, lines in the range from 10 to 300 and on average 90 mol. % of the Alk-O units in the group $(Alk-O)_n$ stand for $CH_2$—$CH_2$—O.

Accordingly, the present invention further relates to comb polymers which have a carbon backbone which bears polyether groups of the general formula A and functional groups B which are present in the form of anionic groups at pH>12, wherein in the formula A the variables *, U, X, k, Alk, Y, Z, R and R' have the aforesaid meanings and n stands for a whole number the mean value whereof, based on the comb polymer, lies in the range from 10 to 300 and wherein on average at least 90 mol. % of the Alk-O units in the group $(Alk-O)_n$ stand for $CH_2$—$CH_2$—O.

The comb polymers according to the invention can also be used in combination with known grinding aids, for example triethanolamine or various carboxylic acids or salts thereof such as octadecanoic acid or salts thereof.

The comb polymers can be packed both in powdery form and in solution.

Cement-containing preparations in the sense of the present invention are inorganic, as a rule mineral substances, which, when mixed with water, are in particular understood to be hydraulic binding agents, such as lime and in particular cement, including latently hydraulic binding agents, such as blast furnace slags.

The comb polymers according to the invention are suitable in particular as grinding aids for preparations of hydraulic binding agents, and quite especially as grinding aids for cement-containing preparations.

Here and below, $C_2$-$C_4$ alkylene stands for a linear or branched alkanediyl group which has 2 to 4 C atoms, in particular for a 1,2-ethanediyl group, which can bear one or two methyl groups or an ethyl group, i.e. for 1,2-ethanediyl, 1,2-propanediyl, 1,2-butanediyl, 1,1-dimethylethane-1,2-diyl or 1,2-dimethylethane-1,2-diyl.

$C_1$-$C_8$ alkylene stands for a linear or branched alkanediyl group which has 1 to 8 and in particular 1 to 4 C atoms, e.g. for $CH_2$, 1,1-ethanediyl, 1,2-ethanediyl, 1,1-propanediyl, 1,3-propanediyl, 2,2-propanediyl, 1,2-propane-diyl, 1,1-butanediyl, 1,2-butanediyl, 1,3-butanediyl, 1,4-butanediyl, 2,2-butanediyl, 1,1-dimethylethane-1,2-diyl or 1,2-dimethylethane-1,2-diyl.

$C_1$-$C_4$- or $C_1$-$C_6$ alkyl stands for a linear or branched alkyl group which has 1 to 4 C atoms, e.g. for methyl, ethyl, n-propyl, isopropyl, n-butyl, 2-butyl, 2-methylpropane-1-yl or tert.-butyl. $C_1$-$C_{10}$ alkyl stands for a linear or branched alkyl group, which has 1 to 10 C atoms, e.g. for $C_1$-$C_4$ alkyl, as previously stated, and for pentyl, hexyl, 1-methylpentyl, 2-methylpentyl, heptyl, octyl, 1-methylheptyl, 2-methylheptyl, 2,4,4-trimethylpentane-2-yl, 2-ethylhexyl, 1-ethylhexyl, nonyl, isononyl, decyl, 1-methylnonyl, 2-propylheptyl and the like.

$C_1$-$C_4$ alkoxy stands for a linear or branched alkyl group which is bound via an oxygen atom and which has 1 to 4 C atoms, e.g. for methoxy, ethoxy, n-propyloxy, isopropyloxy, n-butyloxy, 2-butyloxy, 2-methylpropane-1-yloxy or tert. butoxy. $C_1$-$C_{10}$ alkoxy stands for a linear or branched alkyl group, which is bound via an oxygen atom and which has 1 to 10 C atoms, e.g. for $C_1$-$C_4$ alkoxy, as previously stated, and for pentyloxy, hexyloxy, 1-methylpentyloxy, 2-methylpentylxoy, heptyloxy, octyloxy, 1-methylheptyloxy, 2-methylheptylxoy, 2,4,4-trimethylpentane-2-yloxy, 2-ethylhexyloxy, 1-ethylhexyloxy, nonyloxy, isononyloxy, decyloxy, 1-methylnonyloxy, 2-propylheptyloxy and the like.

With regard to the use according to the invention, it has been found advantageous when the mean number of repeating units Alk-O in the groups $(Alk-O)_n$, i.e. the mean value of n in formula A, based on the comb polymer, is at least 10, in particular at least 20 and especially at least 50 and does not exceed a value of 250, in particular 200 and especially 150. Preferably the value lies in the range from 10 to 250, in particular in the range from 20 to 200 and especially in the range from 50 to 150. The mean value of n or the mean number of repeating units Alk-O is the numerical mean, based on the comb polymer.

In the group $(Alk-O)_n$ the alkylene parts of the individual repeating units Alk-O can be the same or different. In particular, Alk-O preferably stands for 1,2-ethanediyl or mixtures of 1,2-ethanediyl with 1,2-propanediyl. If the groups $(Alk-O)_n$ have different Alk-O units from one another, these can be arranged randomly or blockwise, a blockwise arrangement being preferred. In particular, the Alk-O group which is bound to X is a group of the formula $CH_2CH_2O$.

Further, it has been found advantageous when at least 50 mol. %, in particular at least 80 mol. %, particularly preferably 90 mol. % and in particular all Alk-O groups stand for $CH_2$—$CH_2$—O. These % statements are the numerical mean, based on the total quantity of comb polymer.

If the group $(Alk-O)_n$ has different repeating units Alk-O, it has been found advantageous when on average at least 50 mol. %, e.g. 50 to 99 mol. %, in particular at least 80 mol. %, e.g. 80 to 99 mol. %, and especially at least 90 mol. %, e.g. 90 to 98 mol. % of the Alk-O groups stand for $CH_2$—$CH_2$—O. Among these, those mixtures are preferred wherein the remaining repeating units Alk-O stand for $CH(CH_3)$—$CH_2$—O.

The group Z in formula A preferably stands for a 5- or 6-membered nitrogen heterocycle, which as well as the nitrogen bound to Y and the carbon ring members has a ring member selected from O, S, N, an NR group and/or a carbonyl group as a ring member. In the group NR, R has the meanings stated previously and stands in particular for hydrogen or methyl. Among these, heterocycles are preferred which have a ring member selected from O, N or an NR group and/or a carbonyl group as a ring member. Examples of preferred residues Z are pyrrolidon-1-yl, morpholin-4-yl, piperazin-1-yl, piperidon-1-yl, morpholin-2-on-4-yl, morpholin-3-on-4-yl, piperazin-1-yl, 4-methylpiperazin-1-yl, imidazolin-2-on-1-yl, 3-methylimidazolin-2-on-1-yl and imidazol-1-yl. Among these, morpholin-1-yl and pyrrolidon-1-yl are particularly preferred.

Further it has been found advantageous if Y in formula A stands for $C_2$-$C_4$ alkylene and in particular for 1,2-ethanediyl or 1,3-propanediyl.

U preferably stands for a chemical bond, $CH_2$ or $CH(CH_3)$. In a particularly preferred embodiment, U stands for a chemical bond.

In particular k stands for 1.

In formula A, X preferably stands for O or NH and in particular for O.

In particular, in formula A the variables U, k, X, Y and Z and the variable n jointly have the meanings stated to be preferred.

The groups B present in the comb polymers used according to the invention are typically present in the form of anionic groups, i.e. in deprotonated form, at pH values above 12. Examples of such groups are carboxylate (COOH or $COO^-$), sulfonate ($SO_3H$ or $SO_3^-$), phosphonate ($PO_3H_2$ or $PO_3H^-$ or $PO_3^{2-}$). Preferably, at least 50 mol. %, in particular at least 80 mol. % of the groups B are carboxylate groups.

In a preferred embodiment of the invention, the group B consists essentially (i.e. at least 95 mol. %, especially at least 99 mol. %) or exclusively of carboxylate groups. In another embodiment of the invention, the comb polymers have at least two different functional groups B, wherein in this embodiment preferably 50 to 99 mol. %, in particular 80 to 99 mol. % of the functional groups B are carboxylate groups and the remaining 1 to 50 mol. %, in particular 1 to 20 mol. %, are sulfonate groups.

The functional groups B can be bound to the carbon backbone of the polymer chain directly or via a spacer. Typical spacers are $C_1$-$C_4$ alkanediyl, phenylene and groups of the formula

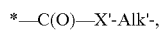

wherein X' stands for O, NH or N($C_1$-$C_4$ alkyl), Alk' for $C_2$-$C_4$ alkylene, in particular for 1,2-ethanediyl, 1,3-propanediyl, 1,2-propanediyl or 1-methyl-1,2-propanediyl and * means the binding site of the spacer to the polymer backbone. In a preferred embodiment of the invention, the group B is bound to the carbon backbone of the comb polymer directly, i.e. via a single bond.

Further, as well as the aforesaid groups of the formula A and the functional groups B, the comb polymer can also comprise groups of the formula C

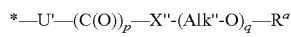

wherein
U' has the meanings stated for U, p stands for 0 or 1, X" has the meanings stated for X, Alk" has the meanings previously stated for Alk, q stands for a whole number the mean value whereof, based on the comb polymer lies (numerical mean) in the range from 2 to 300, in particular in the range from 10 to 250, particularly preferably in the range from 20 to 200 and especially in the range from 50 to 150 and $R^a$ is selected from hydrogen, $C_1$-$C_{10}$ alkyl, $C_1$-$C_{10}$ alkylcarbonyl, benzyl or benzoyl. In formula C, p stands in particular for 1. U' stands in particular for a chemical bond. X" stands in particular for oxygen. $R^a$ stands in particular for $C_1$-$C_4$ alkyl and especially for methyl. Concerning the preferred meanings of Alk", what was previously stated for Alk applies analogously.

In principle, the polyether groups A and also the polyether groups C within the comb polymer can be the same or different as regards the number of the repeating units n and q respectively in the (Alk-O)$_n$ and (Alk"-O)$_q$ groups, while it should be noted that the groups A and C and the groups (Alk-O)$_n$ and (Alk"-O)$_q$ have a molecular weight distribution and thus n and q represent mean values (numerical means) of these molecular weight distributions. The term "the same" therefore means that the molecular weight distribution of the groups A and C each has one maximum. The term "different" correspondingly means that the molecular weight distribution of the groups A and C corresponds to several superimposed distributions and accordingly has several maxima. Comb polymers wherein the molecular weight distributions of the groups A or, when present, the molecular weight distributions of the groups A are different from those of the groups C, are preferred. In particular, those comb polymers are preferred wherein the numerical means of the molecular weight each assigned to a maximum differ from one another by at least 130 Daltons and in particular at least 440 Daltons. Accordingly, comb polymers are preferred which have at least two, e.g. 2, 3, 4, 5 or 6 types of different groups A (below: groups A1 and A2 or A1, A2 . . . Ai; i a whole number, e.g. 3, 4, 5 or 6), wherein the respective mean values n(A1) and n(A2) or n(Ai) differ by a value of at least 3 and in particular by at least 10. Accordingly, comb polymers with groups of the formula A and the formula C wherein the mean values of n and q differ by a value of at least 3 and in particular by at least 10 are also preferred.

In the comb polymers used according to the invention, the polyether groups of the formula A and the functional groups B typically lie in a mole ratio A:B in the range from 2:1 to 1:20, commonly in the range from 1.5:1 to 1:15, in particular in the range from 1:1 to 1:10 and especially in the range from 1:1.1 to 1:8 (averaged over the whole quantity of comb polymers). If the comb polymer has polyether groups of the formula C, the mole ratio of polyether groups of the formula A and C to the functional groups B, i.e. the mole ratio (A+C):B typically lies in the range from 2:1 to 1:20, commonly in the range from 1.5:1 to 1:15, in particular in the range from 1:1 to 1:10 and especially in the range from 1:1.1 to 1:1 (averaged over the whole quantity of comb polymers).

As well as the aforesaid groups of the formula A, the functional groups B and the optionally present groups C, the comb polymer can also to a lesser extent bear functional groups C' on the carbon backbone. These include in particular $C_1$-$C_8$ alkoxycarbonyl groups wherein the alkoxy residue can bear one or several hydroxy groups, nitrile groups and groups of the formula Z as defined above.

The content of the functional groups C', based on the total quantity of the functional groups A, B, optionally C and C' will preferably not exceed 30 mol. %, in particular 20 mol. % and, if present, typically lies in the range from 1 to 30 mol. % and in particular in the range from 2 to 20 mol. %. In a preferred embodiment, the comb polymers have no functional groups C', or less than 2 mol. %, in particular less than 1 mol. %.

In a preferred embodiment the comb polymer has 5 to 80 mol. %, in particular 10 to 60 mol. %, groups of the formula C, each based on the total quantity of the functional groups A, B, C and optionally C'. In this embodiment, the mole ratio of the side chains A to the groups C, i.e. the mole ratio A:C preferably lies in the range from 1:10 to 20:1, in particular in the range from 1:2 to 10:1. In another preferred embodiment of the invention, the comb polymer has no groups of the formula C', or less than 5 mol. %, in particular less than 1 mol. %, each based on the total quantity of the groups A, B, C and C'.

In addition, the comb polymer can also have hydrocarbon residues on the carbon backbone, e.g. $C_1$-$C_4$ alkyl groups or phenyl groups. In a preferred embodiment of the invention, the carbon backbone has $C_1$-$C_4$ alkyl groups, in particular methyl groups on at least every $4^{th}$ C atom of the polymer chain.

Further, it has been found advantageous when on average (numerical average) at least every $4^{th}$ C atom of the polymer backbone and in particular at least every $3^{rd}$ C atom bears a group of the formulae A or optionally C or a functional group B. Further, it has been found advantageous when on average (numerical average) at least one carbon atom which is not substituted by a group A, B or optionally C is positioned between two carbon atoms of the polymer backbone substituted by A, B or optionally C.

The number averaged molecular weight ($M_N$) of the comb polymers as a rule lies in the range from 1000 to 200 000. With regard to the use of the comb polymers, those with a number averaged molecular weight of 5000 to 100 000 are preferred. The number averaged molecular weight $M_N$ can be determined in the usual manner by gel permeation chromatography, as described in the examples. The K values of the copolymers obtainable according to the invention, determined by the method stated below, as a rule lie in the range from 10 to 100, preferably in the range from 15 to 80 and in particular in the range from 20 to 60.

The comb polymers can be used in the form of the free acid or in the form of their salts, wherein in the salt form the groups B can be present partially or completely neutralized. If the comb polymers are used in the form of the salts, for reasons of electrical neutrality they have cations as counter-ions. Suitable cations are alkali metal cations such as $Na^+$ and $K^+$, alkaline earth metal cations such as $Mg^{++}$ and $Ca^{++}$, and ammonium ions, such as $NH_4^+$ and $[NR^bR^cR^dR^e]^+$, wherein $R^b$ stands for $C_1$-$C_4$ alkyl or hydroxy $C_2$-$C_4$ alkyl and the residues $R^c$, $R^d$ and $R^e$ are mutually independently selected from hydrogen, $C_1$-$C_4$ alkyl and hydroxy $C_2$-$C_4$ alkyl. Preferred counter-ions are the alkali metal cations, in particular $Na^+$ and $K^+$.

The production of the comb polymers according to the invention can be effected by analogy with known processes for the production of such comb polymers, e.g. by analogy with the processes described in the state of the technology cited at the outset and by analogy with the processes described in WO 01/40337, WO 01/40338, WO 01/72853 or WO 02/50160, to the disclosure whereof reference is hereby made.

Suitable production processes are in particular:
i) Copolymerization of ethylenically unsaturated monomers M, including
  a) neutral monoethylenically unsaturated monomers M1 which have one or two groups of the formula A, and
  b) monoethylenically unsaturated monomers M2 which have one or two functional groups B,
ii) homo- or copolymerization of ethylenically unsaturated monomers M, including
  a) monoethylenically unsaturated monomers M3, which have one group of the formula A and one functional group B, and optionally
  b) monoethylenically unsaturated monomers M2, which have one or two functional groups B, and
iii) polymeranalogous reaction of homo- or copolymers with a carbon backbone, which have free carboxyl groups or ester-forming derivatives of carboxyl groups, with alcohols of the formula HO-(Alk-O)$_n$—Y—Z or amines of the formula HNR-(Alk-O)$_n$—Y—Z wherein n, Alk, R, Y and Z have the previously stated meanings.

The three production processes i), ii) and iii) all lead to comb polymers according to the invention, while the structure of the comb polymers thereby obtainable naturally depends in a manner in itself known on the particular production method chosen and the quantity and nature of the starting materials used. Thus for example, with the comb polymers obtainable by the production methods i) and ii), the nature and quantity of the side-chains A and the functional groups B respectively depends in a manner in itself known on the nature and the relative quantity of the monomers M1 and M2 or M1 and optionally M3. Again, the molecular weight of the comb polymers in the production methods i) and ii) can be controlled in a manner in itself known through the reaction conditions selected in the polymerization, e.g. through the initiator used, regulators optionally used, the temperature, the reaction medium, concentration of the monomers, etc. With the comb polymers obtainable by the production method iii), the structure and the molecular weight will naturally be largely determined by the homo- or copolymers used and by the alcohols HO-(Alk-O)$_n$—Y—Z or amines of the formula HNR-(Alk-O)$_n$—Y—Z used for the modification.

Comb polymers obtainable by the method i) are preferable according to the invention, and thus constitute a particularly preferred object of the invention.

In the production process i), the nature and quantity of the monomers M determine the nature and number of the side-chains of the formula A.

Preferred monomers M1 are those wherein k in formula A stands for 1. Preferred monomers M1 are thus selected from the esters of monoethylenically unsaturated $C_3$-$C_8$ monocarboxylic acids and diesters of monoethylenically unsaturated $C_4$-$C_8$ dicarboxylic acids with alcohols of the formula HO-(Alk-O)$_n$—Y—Z, wherein n, Alk, Y and Z have the previously stated meanings, and the amides of monoethylenically unsaturated $C_3$-$C_8$ monocarboxylic acids with amines of the formula NHR-(Alk-O)$_n$—Y—Z, wherein n, Alk, R, Y and Z have the previously stated meanings.

Preferred esters of monoethylenically unsaturated $C_3$-$C_8$ monocarboxylic acids are the esters of acrylic acid and methacrylic acid.

Examples of diesters of monoethylenically unsaturated $C_4$-$C_8$ dicarboxylic acids are the esters of fumaric acid, itaconic acid and maleic acid.

Preferred amides of monoethylenically unsaturated $C_3$-$C_8$ monocarboxylic acids are the amides of acrylic acid and methacrylic acid.

Possible monomers M1 also include vinyl, allyl and methallyl ethers of alcohols of the formula HO-(Alk-O)$_n$—Y—Z, wherein n, Alk, Y and Z have the previously stated meanings.

Preferably the monomers M1 include at least 80 mol. %, in particular at least 90 mol. %, based on the total quantity of the monomers M1, of esters of monoethylenically unsaturated $C_3$-$C_8$ monocarboxylic acids, in particular esters of acrylic acid and methacrylic acid. In particular the monomers M1 are selected from the aforesaid esters of monoethylenically unsaturated $C_3$-$C_8$ monocarboxylic acids, and especially from the esters of acrylic acid and methacrylic acid.

The monomers M2 include:
M2a monoethylenically unsaturated mono- and dicarboxylic acids with 3 or 4 to 8 C atoms such as acrylic acid, methacrylic acid, crotonic acid, isocrotonic acid, maleic acid, fumaric acid and itaconic acid.
M2b monoethylenically unsaturated sulfonic acids with preferably 2 to 10 C atoms and salts thereof, in particular alkali metal salts thereof such as vinylsulfonic acid, allylsulfonic acid, methallylsulfonic acid, styrenesulfonic acid, 2-acryloxyethanesulfonic acid and 2-acrylamido-2-methylpropanesulfonic acid, and
M2b monoethylenically unsaturated phosphonic acids with preferably 2 to 10 C atoms such as vinylphosphonic acid, allylphosphonic acid, 2-acryloxy-ethanephosphonic acid and 2-acrylamido-2-methylpropanephosphonic acid,
M2d half esters of monoethylenically unsaturated dicarboxylic acids with 4 to 8 C atoms, in particular half esters of maleic acid, fumaric acid and itaconic acid with $C_1$-$C_{10}$ alkanols, in particular with $C_1$-$C_4$ alkanols, e.g. the monomethyl, monoethyl or monobutyl esters of these acids and the monoesters of these acids with alcohols of the formula HO(Alk"-O)$_q$—R$^a$, wherein q, Alk" and R$^a$ have the previously stated meanings, and the salts of these monomers, in particular alkali metal salts thereof.

Preferred monomers M2 contain at least 50 mol. %, in particular at least 70 mol. %, based on the total quantity of the monomers M2, of monoethylenically unsaturated mono- and dicarboxylic acids with 3 or 4 to 8 C atoms, and particularly preferably among these acrylic acid and methacrylic acid. In a preferred embodiment, the monomers M2 are selected from monoethylenically unsaturated mono- and dicarboxylic acids with 3 or 4 to 8 C atoms, in particular from acrylic acid and methacrylic acid. In another embodiment of the invention, the monomers M2 include M50 to 99 mol. %, in particular 70 to 95 mol. %, based on the total quantity of the monomers M2, of monoethylen-ically unsaturated mono- and dicarboxylic acids with 3 or 4 to 8 C atoms, and particularly preferably among these acrylic acid and methacrylic acid, and 1 to 50 mol. %, in particular 5 to 35 mol. %, based on the total quantity of the monomers M2, of monoethylenically unsaturated sulfonic acids with preferably 2 to 10 C atoms.

The monomers M3 include in particular half esters of monoethylenically unsaturated $C_4$-$C_8$ dicarboxylic acids with alcohols of the formula HO-(Alk-O)$_n$—Y—Z, wherein n, Alk, Y and Z have the previously stated meanings, especially the half esters of maleic acid, fumaric acid and itaconic acid.

In addition, the monomers M can include further monomers M4 and M5.

Monomers M4 are monoethylenically unsaturated monomers which contain one or two groups of the formula C and optionally a functional group B. These include vinyl, allyl and methallyl ethers of alcohols of the formula HO(Alk"O)$_q$—R$^a$, wherein q, Alk" and R$^a$ have the previously stated meanings, and also the esters of these alcohols of monoethylenically unsaturated mono-$C_3$-$C_8$ carboxylic acids and the half and diesters of these alcohols with monoethylenically unsaturated di-$C_4$-$C_8$ carboxylic acids. Preferred monomers M4 are esters of monoethylenically unsaturated mono-$C_3$-$C_8$ carboxylic acids, in particular of acrylic acid and methacrylic acid, with alcohols of the formula HO(Alk"-O)$_q$—R$^a$, wherein q, Alk" and R$^a$ have the previously stated meanings, and diesters of monoethylenically unsaturated di-$C_4$-$C_8$-carbonic acids, in particular maleic acid, fumaric acid, citraconic acid and itaconic acid, with alcohols of the formula HO(Alk"-O)$_q$—R$^a$. Particularly preferred monomers M4 are the esters of monoethylenically unsaturated mono-$C_3$-$C_8$ carboxylic acids, in particular of acrylic acid and methacrylic acid.

Preferably the monomers M4 make up not more than 80 mol. %, in particular not more than 60 mol. %, based on the total quantity of the monomers M. In a preferred embodiment of the invention, the quantity of the monomers M4 is 5 to 80 mol. %, in particular 10 to 60 mol. %, based on the total quantity of the monomers M in the production processes i) or ii). In another embodiment of the invention, its quantity of the monomers M is less than 5 mol. %, in particular less than 1 mol. %. Concerning the mole ratio of monomers M1 to M4 or of monomers M3 to M4, what was previously stated for the mole ratio of the functional groups A:C applies analogously.

The monomers M5 include the monomers M5a, M5b, M5c, M5d and M5e:

M5a $C_1$-$C_{10}$ alkyl esters and $C_5$-$C_{10}$ cycloalkyl esters of monoethylenically unsaturated mono-$C_3$-$C_8$ carboxylic acids, in particular of acrylic acid and methacrylic acid, with $C_1$-$C_{10}$ alkanols or $C_3$-$C_{10}$ cycloalkanols such as methyl acrylate, ethyl acrylate, n-propyl acrylate, iso-propyl acrylate, n-butyl acrylate, iso-butyl acrylate tert.-butyl acrylate, n-hexyl acrylate, 2-ethylhexyl acrylate, cyclohexyl acrylate and the corresponding methacrylic acid esters and corresponding di-$C_1$-$C_{10}$ alkyl esters and di-$C_5$-$C_{10}$ cycloalkyl esters of monoethylenically unsaturated di-$C_4$-$C_8$ carboxylic acids;

M5b hydroxy-$C_2$-$C_{10}$ alkyl esters of monoethylenically unsaturated mono- and di-$C_3$-$C_8$ carboxylic acids, in particular of acrylic acid and methacrylic acid such as 2-hydroxyethyl acrylate, 3-hydroxypropyl acrylate, 4-hydroxybutyl acrylate, 2-hydroxyethyl methacrylate, 3-hydroxypropyl methacrylate and 4-hydroxybutyl methacrylate, M5c monoethylenically unsaturated nitriles such as acrylonitrile, M5d vinylaromatic monomers such as styrene and vinyltoluenes, M5e olefins with preferably 2 to 12 C atoms such as ethylene, propene, 1-butene, isobutene, 1-hexene, diisobutene, 1-octene, 1-decene, 1-dodecene, etc.

Preferred monomers M5 are the monomers M5b.

Preferably the monomers M5 make up not more than 30 mol. %, in particular not more than 20 mol. %, based on the total quantity of the monomers M. If desired, their content is as a rule 1 to 30 mol. %, in particular 5 to 20 mol. % of the monomers M in the production process i) or ii). In particular, their content on the monomers M is less than 5 mol. % in particular less than 1 mol. %.

In the process i) the mole ratio of side-chains A to functional groups B, and optionally C and C' usually results directly from the mole ratio of the monomers M1 to the monomers M2 or from the mole ratio of the monomers M1:M2:M4:M5. Accordingly, the mole ratio M1:M2 or (M1+M4):M2 in the case of monobasic acids as a rule lies in the range from 2:1 to 1:20, in particular in the range from 1:1 to 1:10 us especially in the range from 1:1.1 to 1:8. If the monomers M in the production process i) include monomers M2 with more than one acid group or monomers M3 the mole ratio of the monomers follows correspondingly.

Accordingly, the quantity of the monomers M1 in the production process i) is typically 5 to 65 mol. %, in particular 10 to 50 mol. % and the quantity of the monomers M2 35 to 95 mol. %, in particular 50 to 90 mol. %, wherein the content of any further monomers M3 or M5, can be up to 30 mol. %, in particular up to 20 mol. % and the content of the monomers M4 up to 80 mol. %, in particular up to 60 mol. %, e.g. 5 to 80 mol. %, in particular 10 to 60 mol. %, each based on the total mole number of the monomers M, wherein of course the mole numbers of all monomers M add up to 100 mol. %, unless otherwise stated.

In the process ii) the mole ratio of side-chains A to functional groups B follows in a manner analogous to the process i) from the mole ratio of the monomers M3 to the optionally used monomers M2 or M1 or M4. This applies correspondingly for the relationship between the mole ratio of side-chains A to side-chains C or to functional groups B.

Accordingly, the quantity of the monomers M3 in the production process ii) is typically 40 to 100 mol. %, in particular 50 to 95 mol. % and the quantity of the monomers M2 0 to 60 mol. %, in particular 5 to 50 mol. %, wherein the mole number of any further monomers M2 or M5 can be up to 30 mol. %, in particular up to 20 mol. % and the content of the monomers M4 can be up to 80 mol. %, in particular up to 60 mol. %, e.g. 5 to 80 mol. %, in particular 10 to 60 mol. %, each based on the total mole number of the monomers M, wherein of course the mole numbers of all monomers M add up to 100 mol. %, unless otherwise stated.

In addition, for increasing the molecular weight of the polymer, it can be advantageous to perform the polymerization of the monomers M in the presence of small quantities of multiply ethylenically unsaturated monomers with e.g. 2, 3 or 4 polymerizable double bonds (cross-linkers). Examples of these are diesters and triesters of ethylenically unsaturated carboxylic acids, in particular the bis- and trisacrylates of diols or polyols with 3 or more OH groups, e.g. the bisacrylates and the bismethacrylates of ethylene glycol, diethylene glycol, triethylene glycol, neopentyl glycol or polyethylene glycols. Such cross-linkers are, if desired, as a rule used in a quantity of 0.01 to 5 wt.-% based on the total quantity of the monomers M to be polymerized. Preferably, less than 0.01 wt.-% and in particular no cross-linker monomers are used.

The polymerization of the monomers M usually takes place in the presence of radical-forming compounds, so-called initiators. Such compounds are usually used in quantities up to 30 wt.-%, preferably 0.05 to 15 wt.-%, in particular 0.2 to 8 wt.-%, based on the monomers to be polymerized. With initiators consisting of several components (for example, initiator systems with redox initiator systems) the above weight information relates to the sum of the components.

Suitable initiators are for example organic peroxides and hydroperoxides, and also peroxodisulfates, percarbonates, peroxide esters, hydrogen peroxide and azo compounds. Examples of initiators are hydrogen peroxide, dicyclohexyl peroxidicarbonate, diacetyl peroxide, di-tert.-butyl peroxide, diamyl peroxide, dioctanoyl peroxide, didecanoyl peroxide, dilauroyl peroxide, dibenzoyl peroxide, bis(o-toluoyl)peroxide, succinyl peroxide, methyl ethyl ketone peroxide, di-tert.-butyl hydroperoxide, acetylacetone peroxide, butyl peracetate, tert.-butyl permaleate, tert.-butyl perisobutyrate, tert.-butyl perpivalate, tert.-butyl peroctoate, tert.-butyl perneodecanoate, tert.-butyl perbenzoate, tert.-butyl hydroperoxide, cumene hydroperoxide, tert.-butyl perneodecanoate, tert.-amyl perpivalate, tert.-butyl perpivalate, tert.-butyl perbenzoate, tert.-butyl peroxi-2-ethylhexanoate and diisopropyl peroxi-dicarbamate; and also, lithium, sodium, potassium and ammonium peroxo-disulfate, azo initiators 2,2'-azobis-isobutyronitril, 2,2'-azobis(2-methylbutyronitrile), 2,2'-azobis[2-methyl-N-(-2-hydroxyethyl)propionamide, 1,1'-azobis(1-cyclohexanecarbonitrile), 2,2'-azobis(2,4-dimethylvalero-nitrile), 2,2'-azobis(N,N'-dimethylenisobutyroamidine) dihydrochloride, and 2,2'-azobis(2-amidinopropane) dihydrochloride, and the redox initiator systems explained below.

Redox initiator systems contain at least one peroxide-containing compound in combination with a redox co-initiator, e.g. a sulfur compound with reducing action, e.g. bisulfites, sulfites, thiosulfates, dithionites and tetra-thionates of alkali metals or of ammonium compounds. Thus combinations of peroxodisulfates with alkali metal or ammonium hydrogen sulfites can be used, e.g. ammonium peroxodisulfate and ammonium disulfite. The proportion of the peroxide-containing compound to the redox co-initiator is 30:1 to 0.05:1.

The initiators can be used alone or mixed together, e.g. mixtures of hydrogen peroxide and sodium peroxodisulfate.

The initiators can be both water-soluble or also not or only slightly soluble in water. For polymerization in an aqueous medium, water-soluble initiators are preferably used, i.e. initiators which are soluble in the aqueous polymerization medium at the concentration normally used for the polymerization. These include peroxodisulfates, azo initiators with ionic groups, organic hydroperoxides with up to 6 C atoms, acetone hydroperoxide, methyl ethyl ketone hydroperoxide and hydrogen peroxide, and the aforesaid redox initiators. In a particularly preferred embodiment of the polymerization processes i) or ii) the initiator used includes at least one peroxodisulfate, e.g. sodium peroxodisulfate.

In combination with the initiators or the redox initiator systems, transition metal catalysts can also be used, e.g. salts of iron, cobalt, nickel, copper, vanadium and manganese. Suitable salts are e.g. iron(II) sulfate, cobalt(II) chloride, nickel(II) sulfate, or copper(I) chloride. Based on the monomers, the transition metal salt with reducing action is used at a concentration of 0.1 ppm to 1000 ppm. Thus combinations of hydrogen peroxide with iron(II) salts can be used, such as for example 0.5 to 30% hydrogen peroxide and 0.1 to 500 ppm of Mohr's salt.

Redox co-initiators and transition metal catalysts, e.g. benzoin, dimethyl-aniline, ascorbic acid and complexes of heavy metals such as copper, cobalt, iron, manganese, nickel and chromium which are soluble in organic solvents can also be used in combination with the aforesaid initiators in the polymerization of the monomers M in organic solvents. The quantities of redox co-initiators or transition metal catalysts normally used are about 0.1 to 1000 ppm, based on the quantities of monomers used.

In order to control the average molecular weight of the comb polymers obtainable according to the invention, it is often advantageous to perform the polymerization of the monomers M in the presence of regulators. For this, normal regulators can be used, in particular organic SH group-containing compounds, in particular water-soluble SH group-containing compounds such as 2-mercaptoethanol, 2-mercaptopropanol, 3-mercaptopropionic acid, cysteine and N-acetylcysteine, and also phosphorus(III) or phosphorus(I) compounds such as alkali metal or alkaline earth metal hypophosphites, e.g. sodium hypo-phosphite, and hydrogen sulfites such as sodium hydrogen sulfite. The polymerization regulators are generally used in quantities of 0.05 to 10 wt. %, in particular 0.1 to 2 wt. %, based on the monomers M. Preferred regulators are the aforesaid SH group-bearing compounds, in particular water-soluble SH group-bearing compounds such as 2-mercaptoethanol, 2-mercapto-propanol, 3-mercaptopropionic acid, cysteine and N-acetylcysteine. With these compounds it has been found particularly effective to use these in a quantity of 0.05 to 2 wt. %, in particular 0.1 to 1 wt. %, based on the monomers. The aforesaid phosphorus (III) and phosphorus(I) compounds and the hydrogen sulfites will normally be used in larger quantities, e.g. 0.5 to 10 wt. % and in particular 1 to 8 wt. %, based on the monomers to be polymerized. The average molecular weight can also be influenced through the selection of the suitable solvent. Thus polymerization in the presence of diluents with benzylic or allylic H atoms leads to a decrease in the average molecular weight owing to chain transfer.

The polymerization of the monomers can be effected by the usual polymerization processes, including solution, precipitation, suspension or solvent-free polymerization. The solution polymerization method, i.e. polymerization in solvents or diluents, is preferred.

The suitable solvents or diluents include both aprotic solvents, e.g. the aforesaid aromatics such as toluene, o-xylene, p-xylene, cumene, chloro-benzene, ethylbenzene, industrial mixtures of alkylaromatics, aliphatics and cycloaliphatics such as cyclohexane and industrial aliphatics mixtures, ketones such as acetone, cyclohexanone and methyl ethyl ketone, ethers such as tetrahydrofuran, dioxan, diethyl ether, tert.-butyl methyl ether, and $C_1$-$C_4$ alkyl esters of aliphatic $C_1$-$C_4$ carboxylic acids such as methyl acetate and ethyl acetate, and also protic solvents such as glycols and glycol derivatives, polyalkylene glycols and derivatives thereof, $C_1$-$C_4$ alkanols, e.g. n-propanol, n-butanol, isopropanol, ethanol or methanol, and water and mixtures of water with $C_1$-$C_4$ alkanols such as e.g. isopropanol/water mixtures. Preferably the copolymerization process according to the invention takes place in water or a mixture of water with up to 60 wt. % of $C_1$-$C_4$ alkanols or glycols as solvents or diluents. Particularly preferably, water is used as the only solvent.

The polymerization of the monomers M is preferably performed with substantial or complete exclusion of oxygen, preferably in an inert gas flow, e.g. a nitrogen flow.

The polymerization process of the monomers M can be performed in the plant usual for polymerization methods. These include stirred tank reactors, stirred tank reactor cascades, autoclaves, tube reactors and kneaders.

The polymerization of the monomers M is normally effected at temperatures in the range from 0 to 300° C., preferably in the range from 40 to 120° C. The polymerization time normally lies in the range from 0.5 hrs to 15 hrs and in particular in the range from 2 to 6 hrs. The pressure prevailing during the polymerization is of minor significance for the success of the polymerization and as a rule lies in the range from 800 mbar to 2 bar and commonly at ambient pressure. With the use of volatile solvents or volatile monomers, the pressure can also be higher.

For further details on the polymerization process, reference is made to EP-A 560 602, EP-A 734 359, EP-A 799 807, EP-A 994 290, WO 01/40337, WO 01/40338 and PCT/EP 2005/009466. The polymerization conditions described therein can be used analogously for the production of the comb polymers according to the invention.

The monomers M2, M4 and M5 are known compounds, which are mostly available commercially.

Some of the monomers M1 and M3 have already been described in the state of the technology, wherein the monomers M1 of M3, wherein n in group A on average stands for a number in the range from 10 to 300, in particular in the range from 20 to 200, especially in the range from 50 to 200 and quite especially in the range from 50 to 150 and wherein at least 90 mol. % of the Alk-O repeating units in the group A stand for $CH_2CH_2O$, are novel and constitute a further object of the present invention. Their production can be effected by analogy with known processes of the state of the technology. Concerning the random and blockwise arrangement of different Alk-O units, what was stated previously for the groups A applies.

Preferred monomers M1 wherein k in the formula A stands for 1 can be produced by esterification of monoethylenically unsaturated $C_3$-$C_8$ monocarboxylic acids or monoethylenically unsaturated $C_4$-$C_8$ dicarboxylic acids with alcohols of the formula HO-(Alk-O)$_n$—Y—Z, wherein n, Alk, Y and Z have the previously stated meanings, or by amidation of monoethylenically unsaturated $C_3$-$C_8$ mono-carboxylic acids with amines of the formula NHR-(Alk-O)$_n$—Y—Z, wherein n, Alk, R, Y and Z have the previously stated meanings. Instead of the $C_3$-$C_8$ mono-carboxylic acids or $C_4$-$C_8$ dicarboxylic acids, ester- or amide-forming derivatives of these acids can also be used, in particular the anhydrides of the acids. Such processes are known from the state of the technology.

Thus for example the production of esters of monoethylenically unsaturated $C_3$-$C_8$ monocarboxylic acids or $C_4$-$C_8$ dicarboxylic acids with alcohols of the formula HO-(Alk-O)$_n$—Y—Z can by a) acid-catalyzed esterification of monoethylenically unsaturated $C_3$-$C_8$ monocarboxylic acids or $C_4$-$C_8$ dicarboxylic acids with alcohols of the formula HO-(Alk-O)$_n$—Y—Z, for example by analogy with the processes described in DE-A 2516933, EP-A 884 290, EP-A 989 108, EP-A 989 109, WO 01/40337, WO 01/40338 and WO 02/50160;

b) transesterification of mono- or di-$C_1$-$C_4$ alkyl esters of monoethylenically unsaturated $C_3$-$C_8$ monocarboxylic acids or $C_4$-$C_8$ dicarboxylic acids with alcohols of the formula HO-(Alk-O)$_n$—Y—Z in the presence of basic or acidic transesterification catalysts by analogy with the process described in DE-A 19602035, U.S. Pat. No. 5,037,978 and EP-A 799 807 or by enzyme catalysis by the process described in EP-A 999 229, c) reaction of anhydrides of monoethylenically unsaturated $C_3$-$C_8$ mono-carboxylic acids or $C_4$-$C_8$ dicarboxylic acids with alcohols of the formula HO-(Alk-O)$_n$—Y—Z, for example by analogy with the process described in WO 01/74736 or in the earlier application PCT/EP 2005/009466, during which, departing from the methods described therein, the addition of a base can in some cases be omitted.

The production of amides of monoethylenically unsaturated $C_3$-$C_8$ monocarboxylic acids with amines of the formula HNR-(Alk-O)$_n$—Y—Z can be effected by analogy with known amidation reactions by amidation of monoethylenically unsaturated $C_3$-$C_8$ monocarboxylic acids or of amide-forming derivatives thereof such as acid chlorides, anhydrides or $C_1$-$C_4$ alkyl esters, with amines.

The production of ethylenically unsaturated ethers or amines, i.e. monomers M1 with a group A, wherein k=0, can be effected by etherification or vinylation of alcohols of the formula HO-(Alk-O)$_n$—Y—Z or by alkenylation or enamine formation from amines of the formula HNR-(Alk-O)$_n$—Y—Z by analogy with standard methods of the state of the technology.

The monomers M3 can be produced by analogy with the methods described here for the monomers M1. In particular the preferred monomers M3 are produced by reaction of anhydrides of monoethylenically unsaturated $C_4$-$C_8$ dicarboxylic acids with alcohols of the formula HO-(Alk-O)$_n$—Y—Z under conditions which result in monoester formation.

According to a preferred embodiment of the invention, the production of the particularly preferred monomers M1 is effected by reaction of anhydrides of monoethylenically unsaturated $C_3$-$C_8$ monocarboxylic acids, in particular of acrylic anhydride or methacrylic anhydride, with alcohols of the formula HO-(Alk-O)$_n$—Y—Z. In contrast to the processes known from the state of the technology, with use of alcohols of the formula HO-(Alk-O)$_n$—Y—Z this process results in particularly good yields.

Here it has been found advantageous to use the anhydride equimolar or in a slight excess, which preferably will not exceed 10 mol. %, commonly 9.5 mol. %, preferably 9 mol. %, in particular 8.5 mol. %, and especially 8 mol. %, based on 1 mol of alcohol, i.e. the quantity of anhydride is typically a maximum of 1.095 mol, preferably not more than 1.09 mol, in particular not more than 1.085 mol and especially not more than 1.08 mol per mol of alcohol. Preferably at least 1.005 mol, in particular at least 1.01 mol and particularly preferably at least 1.02 mol of anhydride per mol of alcohol is used.

In one embodiment of the invention, the reaction of the anhydride with the alcohol is effected in the absence of a base, in particular, when the nitrogen heterocycle Z is a basic residue. In another embodiment of the invention, the reaction of the anhydride with the alcohol is effected in the presence of a base. Among these, bases which are not or only slightly soluble in alcohol at 90° C., i.e. the solubility of the base in the alcohol at 90° C. is not more than 10 g/l and in particular not more than 5 g/l, are preferred.

Examples of such bases include hydroxides, oxides, carbonates and hydrogen carbonates of mono- or divalent metal cations, in particular of elements of the first and second main groups of the periodic system, i.e. of $Li^+$, $Na^+$, $K^+$, $Rb^+$, $Cs^+$, $Be^{2+}$, $Mg^{2+}$, $Ca^{2+}$, $Sr^{2+}$ and $Ba^{2+}$ and of mono- or divalent transition metal cations such as $Ag^+$, $Fe^{2+}$, $Co^{2+}$, $Ni^{2+}$, $Cu^{2+}$, $Zn^{2+}$, $Cd^{2+}$, $Sn^{2+}$, $Pb^{2+}$ and $Ce^{2+}$. The hydroxides, oxides, carbonates and hydrogen carbonates of cations of the alkali and alkaline earth metals and of $Zn^{2+}$ and in particular of $Mg^{2+}$ or $Ca^{2+}$ and particularly preferably of $Na^+$ or $K^+$ are preferred. Among these, the hydroxides and carbonates of these metal ions, in particular the alkali metal carbonates and alkali metal hydroxides and especially sodium carbonate, potassium carbonate, potassium hydroxide and sodium hydroxide, are preferred. In particular lithium hydroxide and lithium carbonate is also suitable. The base is preferably used in a quantity of 0.05 to 0.5 base equivalents and in particular in a quantity of 0.1 to 0.4 base equivalents, based on the alcohol, while larger quantities of base e.g. up to 1 base equivalent are as a rule not disadvantageous. Here it should be noted that with hydroxides and hydrogen carbonates the base equivalents correspond to the mol equivalents used, whereas 1 mol equivalent of a carbonate or oxide in each case corresponds to 2 base equivalents.

The reaction of the anhydride with the alcohol is preferably effected at temperatures in the range from 0 and 150° C., in particular in the range from 20 to 130° C. and particularly preferably in the range from 50 and 100° C. The pressure prevailing during the reaction is of minor importance for the success of the reaction and as a rule lies in the range from 800 mbar to 2 bar and commonly at ambient pressure. Preferably the reaction is performed in an inert gas atmosphere. The reaction of the anhydride with the compound P can be performed in all plant usual for such reactions, e.g. in a stirred tank reactor, in stirred tank vessel cascades, autoclaves, tube reactors or kneaders.

Preferably the reaction of the anhydride with the alcohol is performed until a conversion of the alcohol used of at least 80%, in particular at least 90% and particularly preferably at least 95% is reached. The reaction times necessary for this will as a rule not exceed 5 hrs and are often less than 4 hrs. The conversion can be monitored by $^1$H-NMR spectroscopy of the reaction mixture, preferably in the presence of a strong acid such as trifluoroacetic acid.

The reaction of the anhydride with the alcohol can be performed solvent-free, i.e. without the addition of solvents, or in inert solvents or diluents. As a rule, inert solvents are aprotic compounds. Inert solvents include optionally halogenated aromatic hydrocarbons such as toluene, o-xylene, p-xylene, cumene, chlorobenzene, ethylbenzene, industrial mixtures of alkylaromatics, aliphatic and cycloaliphatic hydrocarbons such as hexane, heptane, octane, isooctane, cyclohexane, cycloheptane, industrial aliphatics mixtures, and also ketones such as acetone, methyl ethyl ketone and cyclohexane, also ethers such as tetrahydrofuran, dioxan, diethyl ether and tert.-butyl methyl ether, and mixtures of the aforesaid solvents such as for example toluene/hexane. Preferably, it is performed without solvents or only with very small quantities of a solvent, as a rule less than 10 wt. %, based on the starting materials, i.e. solvent-free.

It has been found advantageous if the reaction of the anhydride with the alcohol is performed in a reaction medium which contains less than 0.2 wt. % and in particular less than 1000 ppm of water (determined by Karl Fischer titration).

The term "reaction medium" relates to the mixture of the reactants with the base and with optionally used solvents and inhibitor. In the case of moisture-containing starting materials, it has been found advantageous to remove the water before the reaction, e.g. by distillation and particularly preferably by distillation with the addition of an organic solvent that forms a low-boiling azeotrope with water. Examples of such solvents are the previously named aromatic solvents such as toluene, o-xylene, p-xylene, cumene, benzene, chlorobenzene, ethylbenzene and industrial aromatics mixtures, and also aliphatic and cycloaliphatic solvents such as hexane, heptane, cyclohexane and industrial aliphatics mixtures and mixtures of the aforesaid solvents.

The procedure used for the reaction will normally be that the reaction mixture, containing the alcohol, the anhydride and the base and optionally solvent and optionally inhibitor is made to react in a suitable reaction vessel at the temperatures stated above. Preferably, the alcohol and the base and optionally the solvent are first taken, and the anhydride added thereto. The addition of the anhydride is preferably effected at reaction temperature.

If the substances used contain water, the water will preferably be removed before the addition of the anhydride. For example, the alcohol and optionally the base and optionally the solvent are placed in a reaction vessel, then any moisture that may be present is removed in the manner described above, and then the anhydride is added, preferably at reaction temperature.

Furthermore, for the avoidance of an uncontrolled polymerization, it has been found advantageous to perform the reaction of the anhydride with the alcohol in the presence of a polymerization inhibitor. The polymerization inhibitors known for such reactions are suitable, in particular phenols such as hydro-quinone, hydroquinone monomethyl ether, especially sterically hindered phenols such as 2,6-di-tert.-butylphenol or 2,6-di-tert.-butyl-4-methyl-phenol, and also thiazines such as phenothiazine or methylene blue, cerium (III) salts such as cerium(III) acetate and nitroxides, in particular sterically hindered nitroxides, i.e. nitroxides of secondary amines, which bear 3 alkyl groups on each of the C atoms which are adjacent to the nitroxide group, wherein any 2 of these alkyl groups, in particular those which are not located on the same C atom, form a saturated 5- or 6-membered ring with the nitrogen atom of the nitroxide group or the carbon atom to which they are bound, such as for example in 2,2,6,6-tetramethylpiperidin-1-oxyl (TEMPO) or 4-Hydroxy-2,2,6,6-tetramethylpiperidin-1-oxyl (OH-TEMPO), mixtures of the aforesaid inhibitors, mixtures of the aforesaid inhibitors with oxygen, e.g. in the form of air, and mixtures of mixtures of the aforesaid inhibitors with oxygen, e.g. in the form of air. Preferred inhibitors are the aforesaid sterically hindered nitroxides, cerium(III) compounds and sterically hindered phenols and mixtures thereof and mixtures of such inhibitors with oxygen and mixtures of mixtures of these inhibitors with oxygen, e.g. in the form of air. Particularly preferred are inhibitor systems which include at least one sterically hindered nitroxide and one further component, selected from a sterically hindered phenol and a cerium(III) compound, and mixtures thereof with oxygen, e.g. in the form of air. The quantity of inhibitor can be up to 2 wt. %, based on the total quantity of anhydride+alcohol. The inhibitors are advantageously used in quantities of 10 ppm to 1000 ppm, based on the total quantity of anhydride+alcohol. In the case of inhibitor mixtures, this information relates to the total quantity of the components, with the exception of oxygen.

The reaction of the alcohol with the anhydride of a mono-ethylenically unsaturated $C_3$-$C_8$ monocarboxylic acid naturally leads primarily to a mixture of the ester with the monoethylenically unsaturated $C_3$-$C_8$ monocarboxylic acid used and occasionally residues of excess anhydride and unreacted alcohol.

However, the excess anhydride does not as a rule make up more than 10 wt. %, and in particular not more than 5 wt. % of the quantity of anhydride originally used. It has been found advantageous to destroy any anhydride that may be present by reaction with water. The content of unreacted alcohol is preferably not more than 10 wt. % and in particular not more than 5 wt. % of the quantity of alcohol used.

For the separation of the alcohol from the monoethylenically unsaturated $C_3$-$C_8$ monocarboxylic acid formed in the reaction, the latter can in principle be removed by distillation or in another manner, e.g. by extraction of the acid. Also, the ester can be isolated, e.g. by crystallization of the ester from an aqueous medium, whereby the acid and any anhydride present remains in the mother liquor. As a rule, however, no isolation or separation of the ester will be performed. Rather, the mixture of ester with monoethylenically unsaturated $C_3$-$C_8$ monocarboxylic acid will preferably be subjected directly to radical copolymerization, optionally with the addition of further monomers M2 and optionally further ethylenically unsaturated monomers M3, M4 and/or M5.

Analogously, the monomers M1 or M3 produced by esterification by the method a) or by transesterification by the method b) M3 can also be used in the subsequent polymerization of the monomers M directly, i.e. without prior isolation or purification.

If the polymerization of the monomers M is performed as a solution polymerization in water, for many use purposes removal of the water is not necessary. Moreover, isolation of the polymer obtainable according to the invention can be performed in a manner in itself usual, e.g. by spray drying of the polymerization mixture. If the polymerization is performed in a steam-volatile solvent or solvent mixture, the solvent can be removed by introduction of steam, as a result of which an aqueous solution or dispersion of the comb polymer is obtained.

Preferably, the comb polymers are obtained in the form of an aqueous dispersion or solution. The solids content is preferably 10 to 80 wt. %, in particular 30 to 65 wt. %.

A further embodiment of the invention relates to comb polymers which are obtainable by the production process iii). In this, a homo- or copolymer with a carbon backbone which has on the carbon backbone free carboxyl groups or ester-forming derivatives of carboxyl groups is reacted in the sense of a polymeranalogous reaction with alcohols of the formula HO-(Alk-O)$_n$—Y—Z or amines of the formula HNR-(Alk-O)$_n$—Y—Z. Processes for the polymeranalogous reaction of homo or copolymers which contain free carboxyl groups or ester-forming derivatives of carboxyl groups are known from the state of the technology, for example from U.S. Pat. No. 5,840,114, U.S. Pat. No. 5,728,207, WO 98/31643 and WO 01/72853. The processes there described can be used in analogous manner for the production of the comb polymers according to the invention.

Possible polymers with free carboxyl groups or ester-forming derivatives of free carboxyl groups, in particular anhydride groups for example include homo- and copolymers of monoethylenically unsaturated $C_3$-$C_8$ monocarboxylic acids and/or $C_4$-$C_8$ dicarboxylic acids or anhydrides thereof, for example homo- and copolymers of acrylic acid, methacrylic acid, maleic acid and maleic anhydride. These polymers can contain further monomers M2, e.g. sulfonic acid group-bearing monomers such as vinylsulfonic acid, acrylamidomethylpropane-sulfonic acid, methallylsulfonic acid or alkali metal or ammonium salts thereof, but also monomers M4 and/or M5, for example vinyl-aromatic monomers or olefins, incorporated by polymerization.

Suitable carboxyl group-containing polymers are in particular copolymers which consist of
- 5 to 100 wt.-%, in particular 50 to 100 wt. % of at least one mono-ethylenically unsaturated $C_3$-$C_8$ monocarboxylic acid and/or $C_4$-$C_8$ dicarboxylic acid or anhydrides thereof, in particular acrylic acid, methacrylic acid, maleic acid or maleic anhydride, or mixtures thereof;
- 0 to 95 wt. %, in particular 0 to 50 wt. % of monoethylenically unsaturated sulfonic acids, such as vinylsulfonic acid, acrylamido-methylpropanesulfonic acid, meth-allylsulfonic acid and/or alkali metal or ammonium salts thereof
- and 0 to 95 wt. %, in particular 0 to 50 wt. % of one or several esters of monoethylenically unsaturated $C_3$-$C_8$ monocarboxylic acids or $C_4$-$C_8$ dicarboxylic acids, e.g. esters of acrylic acid, methacrylic acid or maleic acid esters of monohydric alcohols with 1 to 8 C atoms in the molecule.

Particularly preferred carboxyl group-containing polymers are homopolymers of acrylic acid and methacrylic acid, copolymers of acrylic acid and methacrylic acid, copolymers of methacrylic acid and vinylsulfonic acid, copolymers of acrylic acid and maleic acid, copolymers of methacrylic acid and maleic acid, copolymers of acrylic acid and an ester of a monoethylenically unsaturated carboxylic acid, copolymers of methacrylic acid and an ester of a mono-ethylenically unsaturated carboxylic acid and the alkali metal or ammonium salts of the said copolymers.

In particular the carboxyl group-containing polymers which are obtainable by radical polymerization of the aforesaid monomers in the presence of one of the aforesaid molecular weight regulators are preferred, in particular those which are obtainable by radical polymerization in aqueous solution in the presence of at least 4 wt. %, based on the monomers used in the polymer-ization, of a water-soluble sulfur compound, wherein the sulfur has the oxidation number +4. Examples of such water-soluble sulfur compounds are sulfur dioxide, sulfurous acid, alkali metal, alkaline earth metal and ammonium salts of sulfurous acid or of disulfurous acid, sodium, potassium, calcium or ammonium formaldehyde sulfoxylate, dialkyl sulfites or mixtures thereof. Of these compounds, potassium, ammonium or calcium sulfite, sodium, potassium, calcium or ammonium disulfite, sodium, potassium, calcium or ammonium hydrogen sulfite or mixtures thereof are particularly preferred. For further details on the polymerization, reference is made to WO 01/72853.

The molecular mass (number averaged) of these polymers typically lies in the range from 500 to 100 000, preferably in the range from 1000 to 50 000. Homopolymers of acrylic acid or methacrylic acid or copolymers of methacrylic acid and acrylic acid are particularly preferred.

Specific examples of acid group-containing polymers (the percentages given refer to weight %) are:
Polyacrylic acid of molecular weight 2000,
Polyacrylic acid of molecular weight 4000,
Polyacrylic acid of molecular weight 8000,
Polyacrylic acid of molecular weight 20 000,
Copolymer of 70% acrylic acid and 30% maleic acid of molecular weight 70 000,
Copolymer of 50% acrylic acid and 50% maleic acid of molecular weight 5000, Copolymer of 70% methacrylic acid and 30% maleic acid of molecular weight 5000,
Copolymer of 70% acrylic acid and 30% methacrylic acid of molecular weight 10 000,
Copolymer of 90% acrylic acid and 10% vinylsulfonic acid of molecular weight 10 000,
Copolymer of 50% acrylic acid and 50% methacrylic acid of molecular weight 6000,
Copolymer of 20% acrylic acid and 80% methacrylic acid of molecular weight 5000,
Copolymer of 80% acrylic acid and 20% methacrylic acid of molecular weight 4000,
Terpolymer of 40% acrylic acid, 40% methacrylic acid and 20% maleic acid of molecular weight 5000.

The molecular weights stated here are the number averaged molecular weights. The reaction of the carboxyl group-containing polymers with the alcohols or amines can take place in the presence or also in the absence of catalysts. As catalysts, for example strong oxo acids such as sulfuric acid, p-toluenesulfonic acid, benzenesulfonic acid, methanesulfonic acid, phosphoric acid and phosphorous acid or hydrogen halide acids such as hydrochloric acid are used. If an acid acting as a catalyst is used in the reaction, the quantities are up to 10 wt. %, preferably up to 5 wt. %, based on the total quantity of carboxyl group-containing polymers and alcohols or amines.

The weight ratio in which the carboxyl group-containing polymer and the alcohols or amine are reacted can be between 99:1 to 1:99 and preferably lies in the range from 1:1 to 5:95 and particularly preferably in the range from 3:7 to 1:9 reacted.

The reaction is for example performed by reacting the aqueous solutions of the polymers optionally with an acid acting as catalyst and the alcohol or amine, and distilling off the water. The distillation of the water from the mixture normally takes place under atmospheric pressure, but can also be performed under vacuum. It is often advantageous if a gas flow is passed through the reaction mixture during the distillation, in order to remove the water and other volatile fractions more quickly. As the gas flow, air, nitrogen or steam can be used. The water can however also be removed under reduced pressure, and in addition a gas flow passed through the reaction mixture. In order to distil the water out of the reaction mixture, energy has to be fed into the mixture. Suitable devices for this are heatable stirred reactor tanks, stirred reactor tanks with external heat exchangers, stirred reactor tanks with internal heat exchangers, thin film evaporators, kneaders or extruders. The evaporating water is removed from the reaction medium via a vent pipe and condensed in a heat exchanger. It contains only small amounts of organic components and can be disposed of via a water treatment plant.

Following or simultaneously with the removal of water from the reaction mixture, a condensation reaction sets in between the polymer and the alcohol or amine. The water forming as a result is also removed from the reaction medium. The reaction is for example performed at temperatures in the range from 100 to 250° C. The temperature for this depends on the reaction plant and the residence time. If for example the condensation is performed in a continuously operated extruder or thin film evaporator, wherein the residence time is only a few seconds or minutes, temperatures between 150 C and 250° C. can advantageously be used. In discontinuously operated stirred reactor tanks or kneaders, for example 1 to 15 hours are needed, and the condensation is usually performed in the temperature range from 100 to 200° C.

In one version of the process, the carboxyl group-containing polymers can first be dewatered, and the powder or granulate thus obtained condensed with the alcohol and/or amine.

After the condensation, the reaction mixture is cooled and optionally dissolved in water. Aqueous solutions of the reaction mixture can for example be produced by adding water with stirring to the reaction mass which is still warm at 50 to 150° C. or by stirring the liquid reaction mass at temperatures of 50 to 150° C. into water. Usually, a quantity of water is used such that a 20 to 95 wt. %, preferably 30 to 50 wt. % aqueous solution of the comb polymer is obtained. Simultaneously with or following the dissolution of the condensation product, a neutralization of the remaining acid groups can optionally be effected. As neutralizing agents, alkali metal or alkaline earth metal oxides or hydroxides in solid form or in the form of 10 to 50 wt. % aqueous solutions or slurries in water are used. Examples of suitable bases are lithium hydroxide, sodium hydroxide, potassium hydroxide, calcium oxide, calcium hydroxide, magnesium oxide, magnesium hydroxide, aluminum oxide and aluminum hydroxide. Depending on the degree of neutralization, the aqueous solutions of the comb polymers can have pH values in the range from 1 to 12.

After the condensation, the reaction mass can also remain undiluted. As a rule on cooling it solidifies to a wax-like mass, which can easily be melted again. This gives rise to various transport options. For example, the reaction mass can be filled into barrels, from which the condensation can be melted out again. It can also be transported and stored in the melted state. It is however also possible to produce and work with aqueous solution.

The water-free melt can also be mixed with inert powders in order to obtain pourable compactates. As inert powders, for example diatomaceous earth, silica gel, amorphous silicic acid and/or amorphous silicon dioxide can be used.

Cement should be understood to mean for example Portland cement, aluminous cement or mixed cement, such as for example pozzolanic cement, slag cement or other types. The comb polymers according to the invention are particularly suitable for cement mixtures which as cement components predominantly contain Portland cement, in particular at least 80 wt. %, based on the cement component. The comb polymers according to the invention are as a rule used for this in a quantity of 0.001 to 0.1 wt. %, preferably 0.01 to 0.05 wt. %, based on the total weight of the grinding stock.

The comb polymers can be added to the cement-containing preparations in solid form or as aqueous solution. Preferably the comb polymer is added to the grinding stock in liquid, i.e. dissolved emulsified or suspended form, for example in the form of the polymerization solution.

The following examples are intended to explain the invention

Analysis:
a) Determination of the K Value:
   The K values of the aqueous sodium salt solutions of the copolymers were determined after H. Fikentscher, Cellulose-Chemie, Vol. 13, 58-64 and 71-74 (1932) in aqueous solution at a pH value of 7, a temperature of 25° C. and a polymer concentration of the sodium salt of the copolymer of 1 wt. %.
b) Determination of the Solids Content:
   The determination is made using the analytical instrument MA30 from the Sartorius company. For this, a defined quantity of the sample (ca 0.5 to 1 g) is weighed into an aluminum dish and dried to constant weight at 90° C. The percentage solids content (SC) is calculated as follows:

$$SC = \text{final weight} \times 100 / \text{quantity weighed out [wt. \%]}.$$

c) Molecular Weight Determination:

The determination of the number averaged and weight averaged molecular weight was effected by Gel Permeation Chromatography (=GPC) with aqueous eluents.

The GPC was performed with an instrument combination from the Agilent company (Series 1100). This comprises:

| | |
|---|---|
| Aerator | Model G 1322 A |
| Isocratic pump | Model G 1310 A |
| Autosampler | Model G 1313 A |
| Column oven | Model G 1316 A |
| Control module | Model G 1323 B |
| Differential refractometer | Model G 1362 A |

In the case of polymers dissolved in water, an 0.08 mol/L TRIS buffer (pH=7.0) in distilled water+0.15 mol/L chloride ions from NaCl and HCl serves as the eluent.

The separation was effected in a separating column combination. The columns Nos. 787 and 788 (each 8×30 mm) from the PSS company with separating material GRAL BIO linear are used. The flow rate was 0.8 mL/min at a column temperature of 23° C.

The calibration is effected with polyethylene oxide standards from the PPS Co. with molecular weights of M=194-1 700 000 [mol/g].

EXAMPLE 1

478 g of methylpolyethylene glycol of molecular mass 1000, 167 g of meth-acrylic acid, 6.5 g of p-toluenesulfonic acid and 0.17 g of phenothiazine were placed in a reactor of 2 liter volume, which was equipped with a stirrer and a distillation head. The mixture was heated for 2 hours at 120° C. while passing a flow of nitrogen. Then a mixture of 3.3 g of water and 1.5 g of methacrylic acid was distilled off under vacuum at 120 mbar for 30 minutes. The vacuum was then broken with nitrogen. The mixture was stirred for a further 2 hours under nitrogen. Next the pressure was again reduced to 100 mbar for 30 minutes. During this, a mixture of 2.9 g of water and 1.5 g of methacrylic acid was distilled off. The vacuum was broken with nitrogen and the esterification continued with stirring for a further 2 hours. The pressure was again reduced to 100 mbar, and a mixture of 0.2 g of water and 0.2 g of methacrylic acid was distilled off. Then the vacuum was broken with nitrogen.

EXAMPLE 2

As Example 1, but used as spray-dried polymer powder.
Testing of the Grinding Aids The effect of different additives on the energy input during the grinding of a cement clinker was analyzed.

For this, a normal commercial tube ball mill with two grinding chambers which worked in a closed circuit and produced a normal commercial Portland cement was studied. The technical information on such a tube ball mill is to be found in ZKG International (Volume 53), No. 10/2000, p. 572 Table 1.

The fill ratio of the grinding medium and the aeration of the mill were not varied.

In each case, 0.02 or 0.06 wt. % of the additive to be tested (relative to the grinding stock) was sprayed onto clinker material for the production of a normal commercial Portland cement, and ground for 4 to 8 hours. At various times, samples were withdrawn and the Blaine mass-related area in $cm^2/g$ determined. In comparison with the unmodified sample, the measured quantities "area created at constant grinding time or constant energy input" and "grinding time or energy input for the creation of a defined area" are measured values proportional to the energy saving.

TABLE 1

Technical Parameters of the Test Mill

| | |
|---|---|
| Mill type | Tube mill with two chambers |
| Mill size | Ø 4.0 m × length 13.0 m |
| Size of $1^{st}$ mill chamber | Ø 3.7 m × length 4.0 m |
| Size of $2^{nd}$ mill chamber | Ø 3.7 m × length 8.2 m |
| Nature of separator | Sturtevant, $1^{st}$ generation |
| First mill chamber | |
| Ball material | cast chromium alloy 550 HB |
| Ball volume | 43.3 m³ |
| Fill ratio | 27.5% |
| Balls type 1 | Ø 90 mm × 18.0 mm |
| Balls type 2 | Ø 80 mm × 18.0 mm |
| Balls type 3 | Ø 70 mm × 17.0 mm |
| Balls type 4 | Ø 60 mm × 17.0 mm |
| Average ball diameter | 75.3 mm |
| Density of balls | 4.445 kg/dm³ |
| Total mass of balls | 70.0 t |
| Second mill chamber | |
| Ball material | cast chromium alloy 600 HB |
| Ball volume | 88.5 m³ |
| Fill ratio | 31.8% |
| Balls type 1 | Ø 50 mm × 17.25 mm |
| Balls type 2 | Ø 40 mm × 17.29 mm |
| Balls type 3 | Ø 30 mm × 32.78 mm |
| Balls type 4 | Ø 25 mm × 34.0 mm |
| Balls type 5 | Ø 20 mm × 34.0 mm |
| Average ball diameter | 32.9 mm |
| Density of balls | 4.810 kg/dm³ |
| Total mass of balls | 135.32 t |

TABLE 2

Test results

| Grinding time [mins] | without grinding aid [Blaine area in $cm^2/g$] | 0.02% Example 1 [Blaine area in $cm^2/g$] | 0.06% Example 1 [Blaine area in $cm^2/g$] | 0.02% Example 2 [Blaine area in $cm^2/g$] | 0.06% Example 2 [Blaine area in $cm^2/g$] |
|---|---|---|---|---|---|
| 30 | 1345 | 1510 | 1650 | 1490 | 1475 |
| 60 | 2015 | 2230 | 2445 | 2480 | 2305 |
| 90 | 2530 | 2525 | 3010 | 2730 | 2650 |
| 120 | 2740 | 2785 | 3250 | 2960 | 2965 |
| 150 | 3195 | 2950 | 3510 | 3160 | 3165 |
| 180 | 3450 | 3290 | 3700 | 3335 | 3380 |
| 210 | 3655 | 3320 | 4085 | 3680 | 3635 |
| 240 | 3850 | 3330 | 4180 | 3935 | 3785 |
| 270 | 3980 | 3700 | 4450 | 4050 | 4020 |
| 300 | 4165 | 3935 | 4625 | 4255 | 4320 |
| 330 | 4300 | 4050 | | 4405 | 4680 |
| 390 | 4560 | 4210 | | | 4990 |

The results show that the energy expenditure is reduced through the addition of the grinding aids according to the invention. The determination of the water demand of all cements obtained as per DIN 196-3 showed that the cements obtained in the presence of Example 1 and 2 had a significantly lower water requirement and hence are outstandingly suitable for the production of mortars and concretes of low processing viscosity.

The invention claimed is:

1. A method for grinding a composition, comprising:
admixing into the composition, as a grinding aid, at least one comb polymer to obtain a grinding stock;
wherein the at least one comb polymer has a carbon backbone which bears polyether groups of formula A:

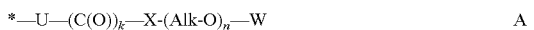

and
functional groups B, which are present in the form of anionic groups at pH>12, and a salt thereof; and
dry-milling the composition to obtain a cement preparation;
wherein in formula A
* indicates the binding site to the carbon backbone of the comb polymer,
U represents a chemical bond or an alkylene group with 1 to 8 C atoms,
X represents oxygen or an NR group,
k is 0 or 1,
n represents a whole number, the mean value whereof, based on the comb polymer lies in the range from 5 to 300,
Alk represents $C_2$ alkylene,
W represents a hydrogen, a $C_1$-$C_6$ alkyl or an aryl residue or a group Y—Z,
wherein
Y represents a linear or branched alkylene group with 2 to 8 C atoms, optionally substituted with a phenyl ring,
Z represents a 5- to 10-membered nitrogen heterocycle bound via nitrogen, optionally comprising 1, 2 or 3 additional hetero atoms, selected from oxygen, nitrogen and sulfur, wherein the nitrogen ring members may optionally be substituted with a group R', and 1 or 2 carbon ring members may optionally be present as carbonyl groups,
R represents hydrogen, $C_1$-$C_4$ alkyl or benzyl, and
R' represents hydrogen, $C_1$-$C_4$ alkyl or benzyl; and
wherein in the carbon backbone, on a numerical average basis,
a $C_1$-$C_4$ alkyl group or a phenyl group is present on at least every fourth carbon of the carbon backbone, and
at least one carbon atom which is not substituted with a polyether group (A) or functional group (B) is positioned between carbon atoms of the polymer backbone which bear a polyether group (A) or functional group (B)
wherein
the composition for grinding comprises at least one selected from the group consisting of cement clinker, granulated slag, pozzolan, fly ash, limestone and calcium sulfate.

2. The method according to claim 1, wherein a content of the grinding aid is from 0.001 to 0.1 wt. %, based on the grinding stock.

3. A cement-containing preparation containing at least one comb polymer which has a carbon backbone which bears polyether groups of the formula A:

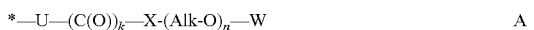

and
functional groups B, which are present in the form of anionic groups at pH>12, and a salt thereof;
wherein
* indicates the binding site to the carbon backbone of the comb polymer,
U represents a chemical bond or an alkylene group with 1 to 8 C atoms,
X represents oxygen or an NR group,
k is 0 or 1,
n represents a whole number, the mean value whereof, based on the comb polymer lies in the range from 5 to 300,
Alk represents $C_2$ alkylene,
W represents a hydrogen, a $C_1$-$C_6$ alkyl or an aryl residue or a group Y—Z,
wherein
Y represents a linear or branched alkylene group with 2 to 8 C atoms, optionally substituted with a phenyl ring,
Z represents a 5- to 10-membered nitrogen heterocycle bound via nitrogen, optionally comprising 1, 2 or 3 additional hetero atoms, selected from oxygen, nitrogen and sulfur, wherein the nitrogen ring members may optionally be substituted with a group R', and 1 or 2 carbon ring members may optionally be present as carbonyl groups,
R represents hydrogen, $C_1$-$C_4$ alkyl or benzyl,
R' represents hydrogen, $C_1$-$C_4$ alkyl or benzyl; and
wherein in the carbon backbone, on a numerical average basis,
a $C_1$-$C_4$ alkyl group or a phenyl group is present on at least every fourth carbon of the carbon backbone, and
at least one carbon atom which is not substituted with a polyether group (A) or functional group (B) is positioned between carbon atoms of the polymer backbone which bear a polyether group (A) or functional group (B)
wherein the cement-containing preparation is a dry mixture.

4. A method for producing a mortar, comprising: admixing the preparation according to claim 3 with water to obtain a mortar.

5. The method according to claim 1, wherein the functional group B is selected from the group consisting of carboxylate, sulfonate, and phosphonate.

6. The method according to claim 5, wherein the functional group B comprises carboxylate groups and a mol % of the carboxylate groups relative to the total functional groups B is at least 50 mol %.

7. The method according to claim 6, wherein at least 80 mol. % of the total functional groups B are carboxylate groups.

8. The method according to claim 1, wherein a mole ratio of A groups to B groups is from 2:1 to 1:20.

9. The method according to claim 1, wherein a mole ratio of A groups to B groups is from 1:1.1 to 1:8.

10. The preparation according to claim 3, wherein the functional group B is selected from the group consisting of carboxylate, sulfonate, and phosphonate.

11. The preparation according to claim 10, wherein the functional group B comprises carboxylate groups and a mol % of the carboxylate groups relative to the total functional groups B is at least 50 mol %.

12. The preparation according to claim 11, wherein at least 80 mol. % of the total functional groups B are carboxylate groups.

13. The preparation according to claim 3, wherein a mole ratio of A groups to B groups is from 2:1 to 1:20.

14. The preparation according to claim 3, wherein a mole ratio of A groups to B groups is from 1:1.1 to 1:8.

* * * * *